April 7, 1936.  E. ENGERT  2,036,323
BOX COLLECTING ELECTRODE FOR ELECTRICAL PRECIPITATORS
Filed Dec. 6, 1934  3 Sheets-Sheet 1
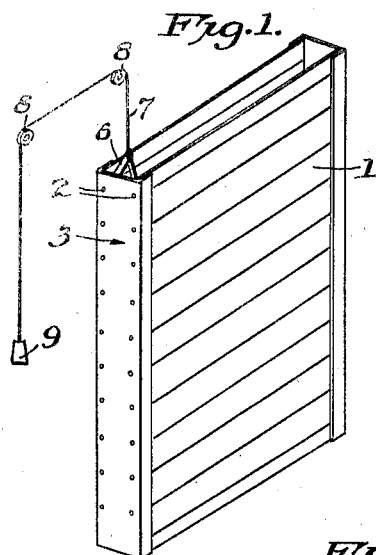
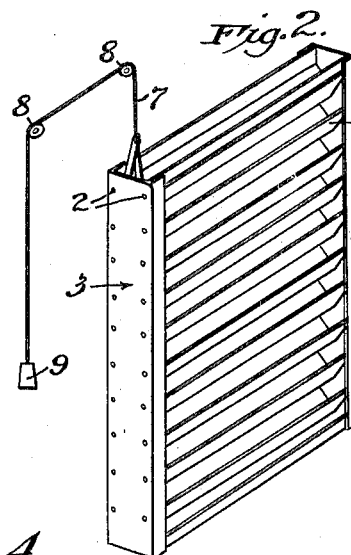
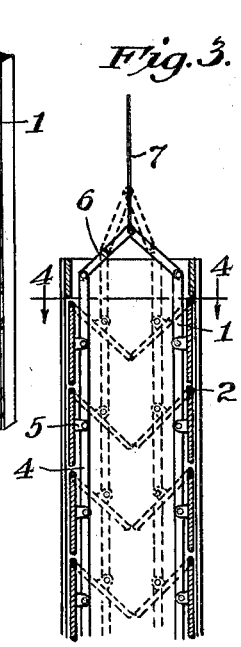
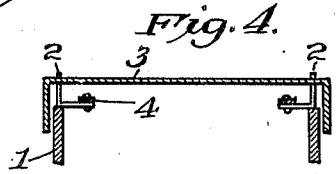
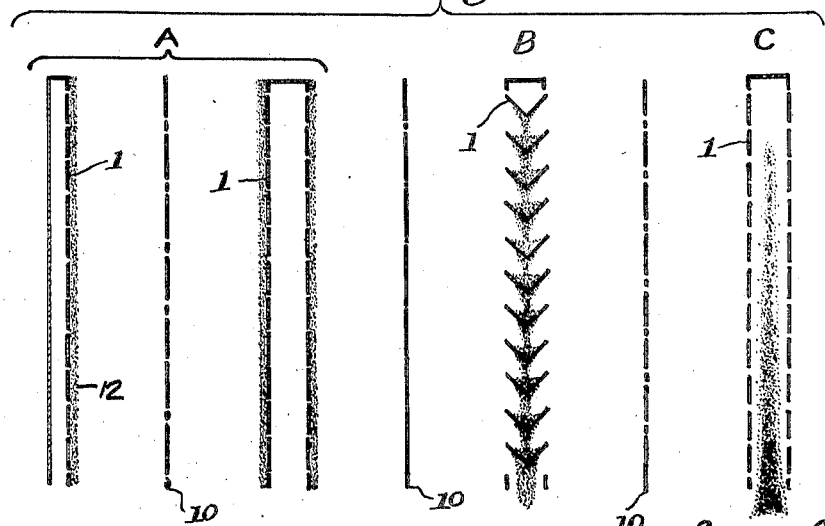

April 7, 1936.  E. ENGERT  2,036,323
BOX COLLECTING ELECTRODE FOR ELECTRICAL PRECIPITATORS
Filed Dec. 6, 1934   3 Sheets-Sheet 2
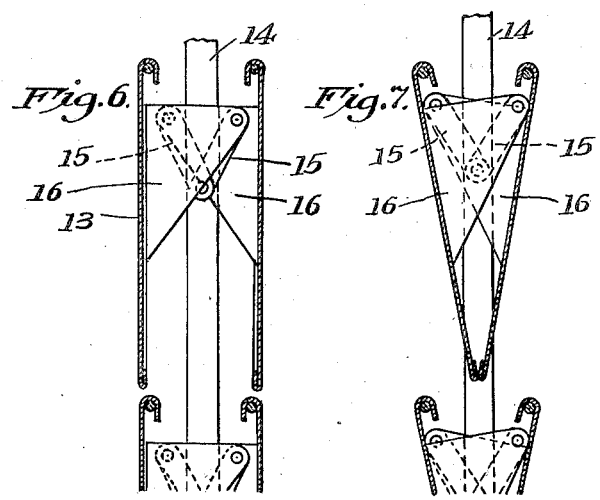
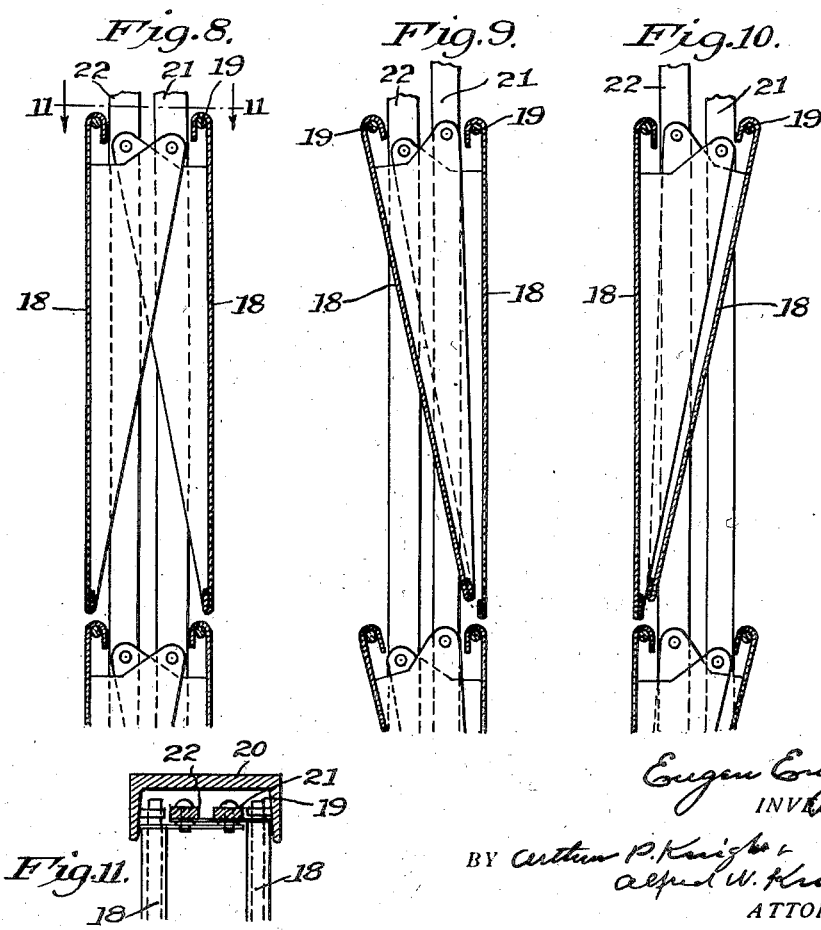

April 7, 1936. E. ENGERT 2,036,323
BOX COLLECTING ELECTRODE FOR ELECTRICAL PRECIPITATORS
Filed Dec. 6, 1934 3 Sheets-Sheet 3
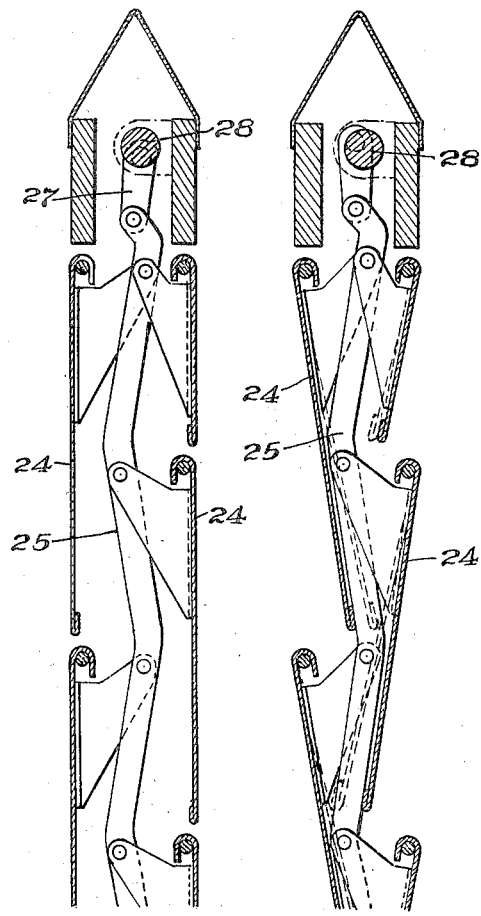
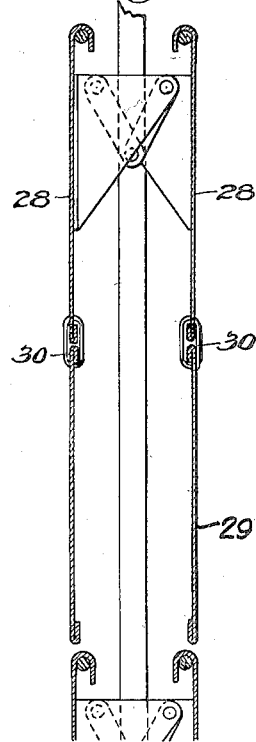
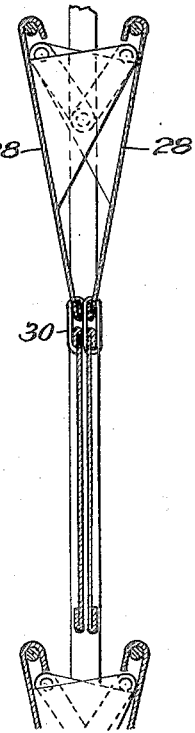

Patented Apr. 7, 1936

2,036,323

UNITED STATES PATENT OFFICE 2,036,323

BOX COLLECTING ELECTRODE FOR ELECTRICAL PRECIPITATORS

Eugen Engert, Frankfort-on-the-Main, Germany, assignor to International Precipitation Company, Los Angeles, Calif., a corporation of California Application December 6, 1934, Serial No. 756,356
In Germany December 14, 1933

5 Claims. (Cl. 183—7)

This invention relates to apparatus for the electrical precipitation of suspended particles from gases, and particularly to a hollow box collecting electrodes for use in such apparatus.

The principal object of the invention is to provide an improved form of collecting electrode of the so-called "box electrode" or "hollow electrode" type, and particularly to provide novel and advantageous means for effecting the movement of precipitated material from the collecting surfaces of such an electrode into the interior thereof, while preventing the material within the interior of said electrode from being picked up by the gas stream.

The previously known box electrodes for electrical precipitators have relatively fixed side walls, in which slots or other perforations are placed. Through these slots the particles separated from the gases are to be conducted into the inside of the box and thus removed from the gas stream. It has been shown, however, that this purpose has not always been achieved and that even when the electrode was jarred by a rapping device, it was impossible to continuously conduct the deposit into the electrode box. If the slots or perforations, as is customary, have edges projecting into the electrical field, dust deposits are apt to adhere to these edges or projections, which when jarred loose, do not pass into the electrode box, but fall back into the gas stream. Furthermore, there is a possibility in such cases that the gas may enter the interior of the electrode through said slots or perforations and may pick up and carry away some of the material which has once been precipitated.

In recognition of these difficulties, this invention endeavors to solve the problem of providing a new method for conduction of the particles into the inside of the hollow box electrodes. According to this invention, the wall which is exposed to the dust deposit, and which may consist of one or more parts, presents a substantially continuous surface, that is, has no perforations or slots of any considerable width or size, but is constructed so that the several parts thereof are movable toward the inside of the box. In this way a conduction of the dust deposit into the interior of the electrode is obtained without necessitating rapping. The solution of the problem is simplified if the wall of the box consists of separate strips or sections mounted for pivotal movement about horizontal axes and toward the interior of the box, said strips normally hanging vertically and thus forming a smooth surface, similar to a Venetian blind. The pivotal axis of each strip is preferably adjacent the upper edge thereof. In this case it is possible to place opposite strips in such a position that they may be moved inward to such position that their lower edges meet. The jarring effected by this striking of the lower edges of the strips causes loosening of the dust deposit and the conduction of the dust into the inside of the box electrode. The arrangement may be such that the opposite strips are alternately movable toward each other and toward the side of the box.

Many alternative forms of construction may be used, especially as to the mechanism used for moving the strips, the arrangement of the axes for the strips, and to forms of the strips themselves, and a number of such modifications will be described herein and illustrated in the accompanying drawings, in which the invention is shown schematically and in several forms of construction.

Referring to the drawings:

Figs. 1 and 2 are perspective views showing a hollow box electrode according to this invention, Fig. 1 showing the closed box with the strips hanging vertically, and Fig. 2 the box with sections or strips moved inwardly to position for discharging the dust into the interior thereof;

Fig. 3 is a vertical section through a box electrode of the type shown in Figs. 1 and 2, looking toward the forward end of said figures;

Fig. 4 is a horizontal section on line 4—4 in Fig. 3;

Fig. 5 shows schematically the operation of the hollow box electrode;

Figs. 6 and 7 are vertical sections through another form of box electrode, in closed and open position respectively;

Figs. 8 to 10 show another form of construction in vertical section with alternately movable strips;

Fig. 11 is a horizontal section on line 11—11 in Fig. 8;

Figs. 12 and 13 show another form of construction of the strips and the operating means therefor;

Figs. 14 and 15 show the construction of a number of strips linked together.

In the form of the invention shown in Figs. 1 to 4 the hollow box electrode is shown as provided with side walls each consisting of a plurality of strips or sections 1 of sheet metal or like material disposed one above another and hinged or mounted by means of pivots 2 at their upper edges on end walls 3, the said side walls and end walls forming a hollow boxlike structure which is open at the bottom for passage. It will be understood that in an electrical precipitator a number of these box electrodes will be mounted in position to permit the gas to be treated to pass between said electrodes, suitable discharge electrodes being provided to maintain electrical fields requisite for causing electrical precipitation of suspended material on the side walls of the box electrodes. The outwardly disposed faces of the strips 1 are preferably substantially flat or plane, as shown. Usually these strips 1 hang in vertical position in a common vertical plane, with the adjacent edges of adjoining strips in close proximity to one another as shown in Fig. 1 and in full lines in Fig. 3, so as to form side walls presenting a substantially continuously smooth plane surface without any projecting edges or bent surfaces. By means of a manually operated or mechanically operated mechanism, said strips 1 may be turned inwardly as indicated in Fig. 2 and in dotted lines in Fig. 3, either as necessary or at predetermined intervals.

The operating mechanism shown in Figs. 3 and 4 comprises vertical bars 4 pivotally connected at 5 to the respective strips or sections 1 and connected at their upper ends by links 6 to an operating cable or member 7 passing over suitable pulley means 8 and provided at its further end with a counter-balance 9 which may also serve as a handle for operating said mechanism.

Fig. 5 shows schematically, in vertical section, several box electrodes mounted to form a plurality of gas passages therebetween, suitable discharge electrodes 10 being positioned between the electrodes and suitable means being provided for maintaining a sufficiently high potential difference between the discharge electrodes and the box electrodes, which operate as collecting electrodes, to cause suspended material carried in gases passing between these electrodes to be deposited on the side walls of the latter. In that portion of the precipitator indicated at A the strips or plates of the side walls of the box electrodes are in closed position so as to form substantially continuous side walls adapted to receive the deposit of precipitated material indicated at 12. At the box electrode indicated at B, the wall plates or strips have been turned inwardly so as to loosen the dust deposit and conduct it into the interior of the box.

As the strips or sections 1 are turned inwardly their lower edges strike one another so as to jar and loosen the deposit and each pair of oppositely placed strips forms a V-shaped trough having inwardly and downwardly inclined walls adapted to receive the material dislodged from the overlying pair of strips and to conduct such material inwardly toward the center of the box electrode. As the distance is short from one pair of strips to the next lower one, dust eddies cannot occur, thereby preventing precipitated material from being caught up by the gases. On release of the pull on the operating mechanism, the strips 1 fall back into their original vertical position, as shown for the electrodes at C in Fig. 5, and the loosened dust, which is contained in the hollow box, descends by gravity to the usual dust hopper or receiving means below the open lower end of the box electrode without disturbing the conditions in the electrical field or coming into contact with the gases passing between the electrodes. The closing of the strips can be effected without interruption of the operation, as the operating mechanism is inside of the box and there are no parts to be injured or rendered dangerous by high voltage.

As shown in Figs. 6 and 7, the operating means for the electrode wall strips or sections indicated at 13 may comprise a common operating bar 14 connected by links 15 to brackets 16 on the strips 13 in such manner that when the bar 14 is drawn upward the opposite strips 13 are drawn inward and strike together to form a V-shaped structure as shown in Fig. 7.

If desired the strips or sections at the opposite sides of the box electrode may be operated alternately. For example, as shown in Figs. 8 to 11 the wall strips indicated at 18, may be pivotally mounted at 19 on the end walls, one of which is shown at 20, and may be operated alternately either by hand or automatically, by means of the bars 21 and 22 pivotally connected respectively to the strips 18 at opposite sides of the box electrode so that by operating the bar 21, for example, all of the strips at one side may be moved inwardly so as to approach or strike the strips at the opposite side as shown in Fig. 9 and in the ensuing operation the said bar 21 is operated to return the strips 18 at that side to normal position and the bar 22 is operated to move the strips 18 at the opposite side inwardly.

Figs. 12 and 13 show a form of the invention in which the wall strips or sections 24 at opposite sides of the box electrodes are staggered or offset. The operating means for the strips 24 comprises a bar 25, pivotally connected to all of the all strips 24 so as to operate the same simultaneously, said bar 25 being operated either manually or mechanically. For example, said bar may be connected by a link 27 to crank or eccentric means 28 whereby said bar is raised and lowered periodically or at any time desired so as to move the wall strips 24 from vertical position shown in Fig. 12 to inclined or inturned position shown in Fig. 13. In this form of the invention the strips of each side wall are shown as spaced apart from the strips of the opposite wall at their lower portions when in inwardly turned position, so that a continuous passage is provided through which the precipitated material may descend after it has been loosened from the strips in the jar due to operation thereof. If desired, the arrangement may be such that each wall strip strikes the operating bar 25 at the end of its inward movement so as to assist in loosening of the material from the strip.

As shown in Figs. 14 and 15 the pivoted wall plate 28 for the box electrode may be provided with extensions as indicated at 29 suspended therefrom, for example, by hinge or link connections 30 so as to increase the dust collecting surface for each wall strip, these strip extensions 29 moving inwardly with the main strips 28 so as to permit the dust to be dislodged therefrom along with the dust from the main strips.

I claim:
1. A box electrode for electrical precipitating apparatus comprising a side wall formed of a plurality of sections disposed one above another and each having a substantially plane outwardly disposed surface, said sections being movably mounted to enable them to be moved to vertical positions in a common vertical plane with their adjacent edges in close proximity with one another, providing a substantially continuous plane surface, and to be moved inward to positions permitting free passage of precipitated material from said plane surfaces into the interior of said box electrode, and operating means for moving said sections between said two positions.

2. A box electrode for electrical precipitating apparatus comprising two spaced side walls each formed of a plurality of sections disposed one above another, each of said sections having a substantially plane outwardly disposed surface, the sections of each wall being movably mounted to enable them to be moved to vertical positions in a common vertical plane with their adjacent edges in close proximity to one another, providing a substantially continuous plane surface, and to be moved inward to positions permitting free passage of precipitated material from said plane surfaces into the interior of said box electrode, and operating means for moving said sections between said two positions.

3. A construction as set forth in claim 2 wherein said operating means is adapted to operate wall sections on opposite sides of the box electrode so as to swing same inwardly to position in which they form a V-shaped trough and their lower edges meet and strike each other.

4. A construction as set forth in claim 2 wherein the sections on opposite sides of the box electrode are movable inward alternately by said operating means.

5. A construction as set forth in claim 2 wherein the sections are pivoted on horizontal axes and each comprises an upper portion and an extension hung therefrom by hinged connection means.

EUGEN ENGERT.